May 22, 1928.

R. G. MILLER

AIRPLANE

Filed Dec. 23, 1925

1,671,081

WITNESS:
Rob'R Kitchel.

INVENTOR
Roy G. Miller
BY
Augustus B. Shoughton
ATTORNEY.

Patented May 22, 1928.

1,671,081

UNITED STATES PATENT OFFICE.

ROY G. MILLER, OF BROOKLAWN, NEW JERSEY, ASSIGNOR OF ONE-HALF TO C. T. LUDINGTON, OF PHILADELPHIA, PENNSYLVANIA.

AIRPLANE.

Application filed December 23, 1925. Serial No. 77,230.

The principal objects of the present invention are to give a stable characteristic to the airplane or, in other words, to prevent movable surfaces from flapping; to provide for the use of extended movable surfaces and in that way to improve the control of the airplane; and to provide for keeping a movable surface, preferably balanced, in neutral position and to relieve the pilot by affording him liberty of movement of his hands.

Other objects of the invention will appear from the following description at the end of which the invention will be claimed.

In the following description reference will be made to the accompanying drawing forming part hereof and in which.

Figure 1:
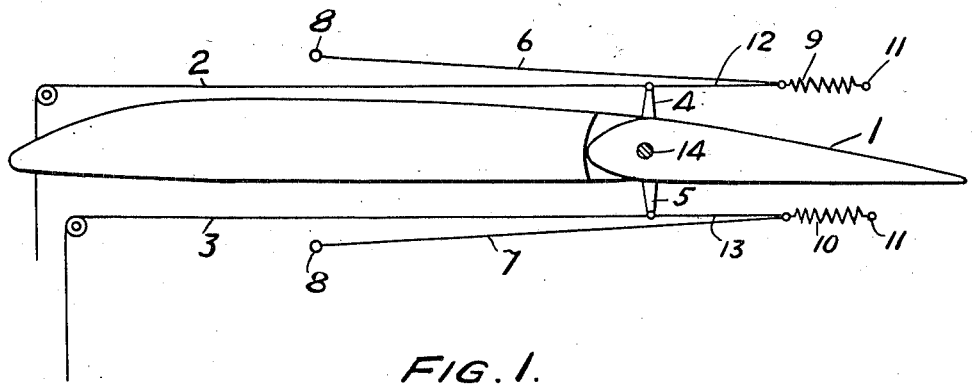
Figure 1 is a view, largely diagrammatic or schematic, of means embodying features of the invention.
Figure 2:
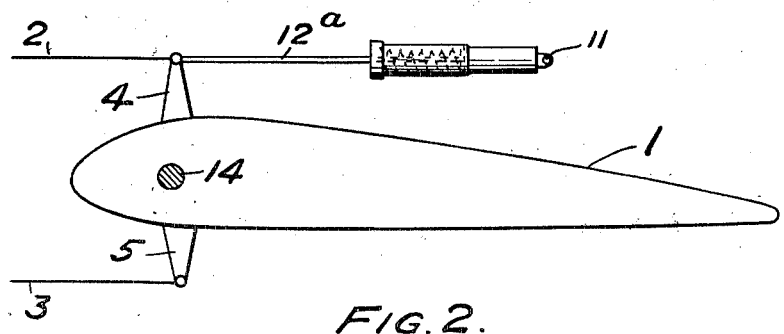
Fig. 2 is a similar view drawn to an enlarged scale and showing only the movable surface and illustrating a modification.
Figure 3:
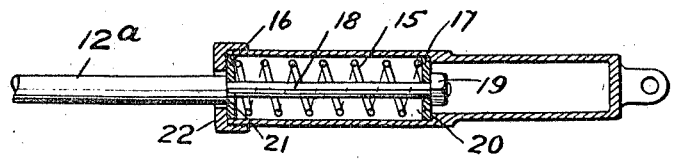
Fig. 3 is a sectional view drawn to an enlarged scale of one of the devices shown in Fig. 2.

In the drawing 1 is a hinged or pivoted auxiliary movable surface and it is shown as balanced. Referring more particularly to Fig. 1, 2 and 3 are control cables for the movable surface 1. These cables 2 and 3 are connected with horns 4 and 5 attached to the movable surface 1, and by extensions 12 and 13 with springs 9 and 10 connected with fixed positions 11, so that the springs are always active. The springs are connected to fixed positions 8 by lines or cords 6 and 7 against which the springs exert their force so that when the controls 2 and 3 are free, the force of the springs is exerted against the fixed positions 8, which, with the lines 6 and 7, and extensions 12 and 13, operate to position the movable surface 1 in neutral position. If the pilot pulls, for example the control 2, he slacks off the control 3 with the result that the spring 9 is distended and the line 6 and extension 13 are slackened, so that the movable surface may be turned about its pivot 14 toward the top of the sheet. A reversal of the described operation takes place when the control 3 is pulled and the control 2 is slackened and in that case the spring 10 is extended, and the extension 12 and line 7 are slackened.

Upon release of either of the controls 2 and 3, the force of the springs 9 and 10, acting upon the horns by the extensions 12 and 13 puts the movable surface 1 in neutral position with the lines 6 and 7 in tension.

The construction and mode of operation of the modification shown in Figs. 2 and 3 are as above described except that the extension 12ª is rigid and use is made of one spring 15 instead of two springs. The spring 15 is inclosed in a housing and compressed between heads 16 and 17, movable, on the stem 18 of the extension between a nut 19 and a shoulder 20 in the housing, and 16 between a shoulder 21 on the extension 12ª and the cap 22 of the housing. When the controls are released the parts occupy the positions shown in Figs. 2 and 3, the spring by its compression or reaction placing and holding the part 1 in neutral or normal position. When control 2 is pulled, parts 19 and 17 move towards the left further compressing the spring against part 16 seated on part 22. When control 3 is pulled, part 16 impelled by shoulder 21 is moved towards the right, spring 15 is further compressed on part 17, part 20 acting as an abutment, the nut 19 of course moves away from the part 17.

It will be obvious to those skilled in the art to which the invention relates that modifications may be made in details of construction and arrangement and mere matters of form without departing from the spirit of the invention which is not limited as to such matters or otherwise than the prior art and the appended claim may require.

I claim:

In an airplane a hinged or pivotal double acting auxiliary movable surface, spring means operatively located to one side of the pivot point of the surface when in neutral position and constructed and arranged to operate in two directions for positioning said surface in neutral position, controls for said surface arranged to operate in opposition to said spring means, and stop elements independent of the controls and acting directly on said springs and constructed and arranged to resist their thrust only when the movable surface is in neutral position.

ROY G. MILLER.